United States Patent
Watanabe et al.

(10) Patent No.: US 9,090,251 B2
(45) Date of Patent: Jul. 28, 2015

(54) IDLING CONTROL DEVICE FOR VEHICLE

(75) Inventors: Kei Watanabe, Chigasaki (JP); Takeshi Ohno, Yamato (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 75 days.

(21) Appl. No.: 13/879,939

(22) PCT Filed: Sep. 29, 2011

(86) PCT No.: PCT/JP2011/072354
§ 371 (c)(1),
(2), (4) Date: Apr. 17, 2013

(87) PCT Pub. No.: WO2012/053333
PCT Pub. Date: Apr. 26, 2012

(65) Prior Publication Data
US 2013/0204478 A1  Aug. 8, 2013

(30) Foreign Application Priority Data
Oct. 18, 2010 (JP) .................. 2010-233193

(51) Int. Cl.
*B60W 10/06* (2006.01)
*B60W 10/08* (2006.01)
(Continued)

(52) U.S. Cl.
CPC ............... *B60W 20/00* (2013.01); *B60K 6/48* (2013.01); *B60W 10/06* (2013.01); *B60W 10/08* (2013.01); *F02D 31/001* (2013.01); *F02D 41/083* (2013.01); *F02P 5/1508* (2013.01); *B60W 2510/0676* (2013.01); *B60W 2510/244* (2013.01); *B60W 2600/00* (2013.01); *B60W 2710/065* (2013.01); *B60W 2710/0644* (2013.01); *B60W 2710/0688* (2013.01); *B60W 2710/0694* (2013.01); *B60Y 2200/92* (2013.01); *F02D 41/0245* (2013.01); *F02D 2200/503* (2013.01); *F02N 2200/061* (2013.01);
(Continued)

(58) Field of Classification Search
CPC ............... B60W 10/08; B60W 20/00; B60W 2510/0657; B60W 2710/0644; B60W 2710/0688; Y02T 10/48
See application file for complete search history.

(56) References Cited

U.S. PATENT DOCUMENTS 5,850,815 A    12/1998  Yano et al.
6,026,921 A *  2/2000  Aoyama et al. ............ 180/65.25
(Continued)

FOREIGN PATENT DOCUMENTS

EP    1 350 950 B1   10/2003
JP    09-287493 A    11/1997
(Continued)

*Primary Examiner* — James Trammell
*Assistant Examiner* — Demetra Smith-Stewart
(74) *Attorney, Agent, or Firm* — Foley & Lardner LLP

(57) ABSTRACT

An idling revolution speed control which maintains an engine speed at a predetermined target idling revolution speed during the idling drive includes an engine idling mode which performs the idling revolution speed control through an engine and a motor idling mode which performs the idling revolution speed control through a motor. The two modes are switched in accordance with a battery charged state. During the idling drive in an engine cold state, an ignition timing of the engine in the motor idling mode is retarded and the retardation quantities R3, R4 are expanded to be larger than the retardation quantities R1, R2 in the engine idling mode. Thus, a rise in an exhaust temperature of the engine is promoted.

6 Claims, 6 Drawing Sheets

(51) Int. Cl.
*B60W 20/00* (2006.01)
*F02D 31/00* (2006.01)
*F02D 41/08* (2006.01)
*F02P 5/15* (2006.01)
*B60K 6/48* (2007.10)
*F02D 41/02* (2006.01)

(52) U.S. Cl.
CPC .............. *Y02T10/46* (2013.01); *Y02T 10/6221* (2013.01); *Y02T 10/6286* (2013.01); *Y10S 903/93* (2013.01)

(56) References Cited

U.S. PATENT DOCUMENTS

| | | | |
|---|---|---|---|
| 6,334,431 B1* | 1/2002 | Kanehiro et al. | 123/406.53 |
| 6,725,830 B2* | 4/2004 | Surnilla | 123/339.11 |
| 7,163,487 B2* | 1/2007 | Tao et al. | 477/3 |
| 7,778,767 B2* | 8/2010 | Santoso et al. | 701/113 |
| 8,209,970 B2* | 7/2012 | Gonze et al. | 60/303 |
| 8,215,429 B2* | 7/2012 | Bryan et al. | 180/65.285 |
| 8,499,734 B2* | 8/2013 | Wang et al. | 123/179.4 |
| 2002/0163199 A1 | 11/2002 | Ramaswamy et al. | |
| 2007/0209619 A1* | 9/2007 | Leone | 123/90.12 |
| 2008/0282673 A1* | 11/2008 | Gonze et al. | 60/284 |
| 2009/0150059 A1* | 6/2009 | Santoso et al. | 701/113 |
| 2010/0108032 A1* | 5/2010 | Pursifull et al. | 123/406.12 |
| 2010/0274423 A1* | 10/2010 | Seel et al. | 701/22 |
| 2011/0004392 A1* | 1/2011 | Senda et al. | 701/102 |
| 2011/0307135 A1* | 12/2011 | Ikeda et al. | 701/22 |
| 2012/0240556 A1* | 9/2012 | Lewis | 60/274 |

FOREIGN PATENT DOCUMENTS

| | | |
|---|---|---|
| JP | 11-280629 A | 10/1999 |
| JP | 2003-041965 A | 2/2003 |
| JP | 2003-090248 A | 3/2003 |
| JP | 2003-293814 A | 10/2003 |
| JP | 2010-208394 A | 9/2010 |

\* cited by examiner

IDLING CONTROL DEVICE FOR VEHICLE

TECHNICAL FIELD

The present invention relates to a vehicle such as a hybrid vehicle in which both of an engine and a motor mutually linked with each other are used together as power sources of the vehicle and, more specifically, relates to a control at a time of an idling drive in an engine cold state.

BACKGROUND ART

Patent document 1 describes a technique which, in a hybrid vehicle in which an engine and a motor are equipped as power sources of the vehicle, improves a control stability of the idling revolution speed control by enabling a switching between an engine idling mode in which an idling speed revolution speed control is carried out through the engine and a motor idling mode in which the idling revolution speed control is carried out through the motor in accordance with a charged state (SOC) of the battery, during an idling drive.

Incidentally, during the idling drive in the cold state in which a warm-up of the engine is not completed, an exhaust rise temperature control to promote the warm up of the engine by raising an exhaust gas temperature of the engine in order to activate, at an early timing, a catalyst installed in an exhaust system of the engine is carried out.

One of the exhaust rise temperature controls includes a known technique to raise the exhaust temperature by reducing a combustion efficiency by retarding a firing timing of the engine (an ignition timing through a spark plug).

PRE-PUBLISHED DOCUMENT

Patent Document

Patent document 1: JP2003-041965

DISCLOSURE OF THE INVENTION

In a case where the ignition timing during the idling drive in the engine cold state is retarded, as the retardation angle quantity (retardation quantity) of the ignition timing becomes larger, the exhaust rise temperature effect becomes higher. However, due to the reduction in a combustion stability and a variation in the engine revolution speed, a control stability of the idling revolution speed control is reduced.

Therefore, it is an object of the present invention to provide an idling revolution speed control apparatus for a vehicle in which the engine and the motor are mutually linked together and which expands a retardation angle quantity of the firing timing of the engine while a stability of the idling revolution speed control is maintained to promote a warm-up of the engine.

The present invention is applicable to a vehicle in which the engine and the motor which are mutually linked together are equipped and in which the idling revolution speed control is performed to maintain the engine revolution speed during the idling drive at a predetermined target idling revolution speed. As a linkage form between the engine and the motor, not only such a linkage form in which both of the engine and the motor are separably connected through a clutch but also such another linkage form in which both of the engine and the motor are directly coupled to each other without intervention of the clutch, or such a still another linkage form in which both of the engine and the motor are linked via a planetary gear mechanism may be applied.

In order to make a best use of the characteristics of the vehicle in which the engine and the motor are equipped, during the idling drive in which the engine speed is maintained at a predetermined target idling revolution speed, an engine idling mode in which the idling revolution speed control is carried out according to the opening angle of an engine throttle valve and a motor idling speed control mode in which the idling revolution speed control is carried out through the revolution speed control of the motor are switchable in accordance with the vehicle driving state. Thus, if, basically, the motor idling mode is used by means of the motor having superior responsive characteristic and controllability, a stable idling drive can be achieved. In addition, in a case where it becomes difficult to maintain the idling drive in the motor idling mode due to the insufficient charge quantity of the battery, the target idling revolution speed can be maintained using the engine idling mode.

Then, according to the present invention, during the idling drive in the engine cold state in which the firing timing of the engine in the motor idling mode is more largely retarded than the ignition timing of the engine in the engine idling mode. In other words, in the motor idling mode, the retardation quantity of the firing timing is expanded to be larger than the engine idling mode in which the idling revolution speed control is performed by the revolution speed control of the motor is switchable according to the vehicle driving state. Thus, during, for example, the idling drive, a stable idling drive can be performed using the motor idling mode by means of the motor which is superior in a response characteristic and a controllability. In addition, in a case where a charge quantity of the battery is insufficient or in a case where the idling drive in the motor idling mode is difficult, the target idling revolution speed can be maintained using the engine idling mode.

According to the present invention, a retardation angle quantity of the firing timing of the engine is expanded without impairing an idling stability so that the warm-up of the engine can be promoted during the idling drive in the engine cold state.

DESCRIPTION OF THE EMBODIMENTS

Hereinafter, a detailed description of a preferred embodiment according to the present invention will be made on a basis of drawings.

First, a basic structure of a hybrid vehicle to

Figure 1:
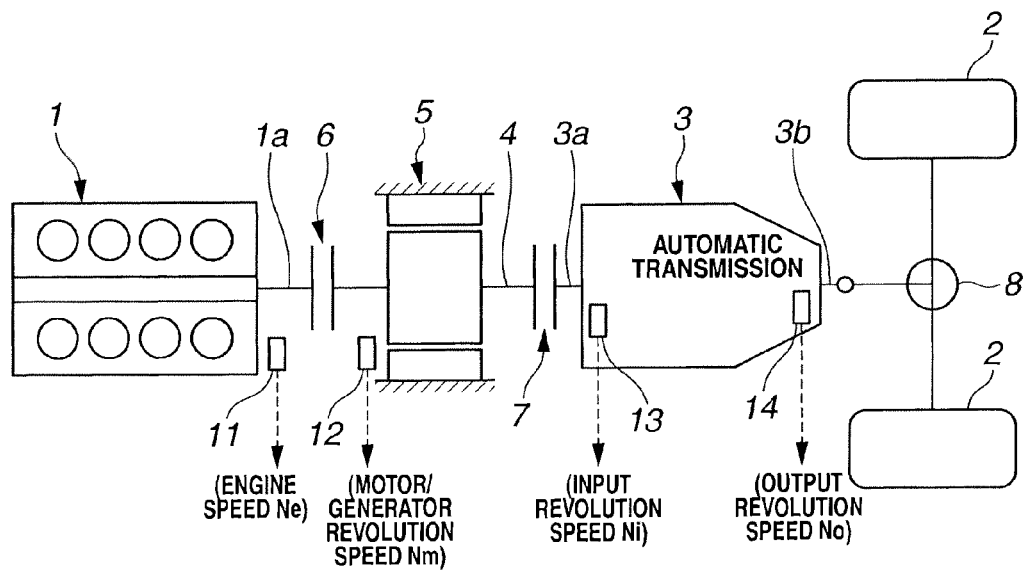
FIG. 1 is a configuration explanatory view representing a preferred embodiment of a power train of a vehicle to which the present invention is applicable.

In the power train of the hybrid vehicle shown in FIG. 1, an automatic transmission 3 is arranged in a tandem configuration at a rear position of a vehicle longitudinal direction of engine 1 in the same way as a normal rear wheel driving vehicle. A motor/generator 5 is integrally mounted on a shaft 4 via which a revolution from engine 1 (crankshaft 1a) is transmitted to an input shaft 3a of automatic transmission 3.

Motor/generator 5 is constituted by a synchronous type motor using permanent magnets as a rotor, acting as a motor (so-called, a power running) and acting as a generator (a power generator) (so-called, a regeneration). As described above, motor/generator 5 is interposed between engine 1 and automatic transmission 3. A first clutch 6 is interposed between engine 1 and automatic transmission 3 and, in more details, interposed between shaft 4 and engine crankshaft 1a. This first clutch 6 is separably united between engine 1 and motor/generator 5.

It should, herein, be noted that above-described first clutch 6 is structured such that a transmission torque capacity is continuously modifiable and is constituted by a normally closed dry type single plate clutch or a wet type multiple plate clutch in which a transmission torque capacity is modifiable by continuously controlling a clutch working hydraulic pressure through a proportional solenoid.

In addition, a second clutch 7 is interposed between motor/generator 5 and driving wheels 2, in more details, intervened between a shaft 4 and input shaft 3a of automatic transmission 3 and this second clutch 7 is separably united between motor/generator 5 and automatic transmission 3.

In the same way as above-described first clutch 6, second clutch 7 can continuously modify the transmission torque capacity and is constituted by the wet type multiple plate clutch or the dry type single plate clutch by controlling continuously the clutch working hydraulic pressure using, for example, the proportional solenoid valve.

Automatic transmission 3 achieves a forward 7-th speed and reverse first speed transmission gear stages by combinations of engagements and releases of these frictional elements by selectively engaging and releasing a plurality of frictional elements (clutch, brake, and so forth). In other words, automatic transmission 3 performs a gear shift for the revolution inputted from input shaft 3a with a gear ratio in accordance with a selected shift stage. This output revolution is distributed and transmitted to the left and right driving wheels (rear wheels) 2 via a differential gear unit 8. It should be noted that automatic transmission 3 is constituted by a stepwise gear type but may be constituted by a continuously variable transmission.

In the above-described power train, two traveling (running) modes are possible, namely, an electric vehicle traveling mode (EV mode) in which the vehicle travels with only a dynamic power of motor/generator 5 as a power source and a hybrid traveling mode (HEV mode) in which the vehicle travels only while engine 1 is included in the power sources together with motor/generator 5.

For example, during a low-load and low-vehicle speed driving including a state from a vehicle stopped state to the vehicle start, the EV mode is requested. However, in the EV traveling mode, the dynamic power from engine 1 is not needed and engine 1 is stopped. At this time, first clutch 6 is released and second clutch 7 is engaged. Thus, automatic transmission 3 is in a power transmission state. In this state, only motor/generator 5 achieves the traveling of the vehicle.

In addition, for example, during a high speed traveling state or large (heavy) load traveling, the HEV mode is required. In this HEV mode, both of first clutch 6 and second clutch 7 are engaged and automatic transmission 3 is in the power transmission state. In this state, both of an output revolution of engine 1 and output revolution of motor/generator 5 are inputted to transmission input shaft 3a of automatic transmission 3 so that a hybrid traveling using both of engine 1 and motor/generator 5 is carried out.

Motor/generator 5 can collect an electric power by regenerating a braking energy during a vehicle deceleration and, in the HEV mode, an excessive energy of engine 1 can be collected as the electric power.

It should be noted that, during a mode transition from the above-described EV mode to the HEV mode, first clutch 6 is engaged and an engine start is carried out using a torque of motor/generator 5. In addition, at this time, a transmission torque capacity of first clutch 6 is variably controlled to be slip engaged so that a smooth transition of the mode is possible.

In addition, second clutch 7 functions as a start clutch and slip engaged by variably controlling the transmission torque capacity during the start of the vehicle so that a torque variation is absorbed by the power train in which no torque converter is equipped and a smooth start of the vehicle can be possible.

It should be noted that second clutch 7 which is interposed between motor/generator 5 and driving wheels 2 and is intervened between motor/generator 5 and automatic transmission 3. As in the preferred embodiment shown in FIG. 2, second clutch 7 may be intervened between automatic transmission 3 and a differential gear unit 8.

Figure 2:
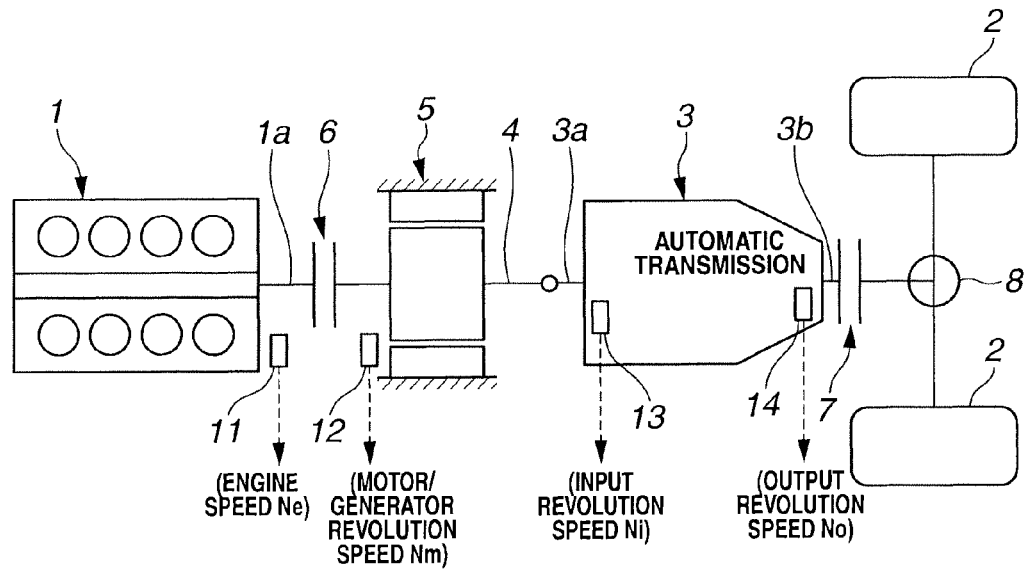
FIG. 2 is a configuration explanatory view representing a modification of the power train of the vehicle to which the present invention is applicable.
Figure 3:
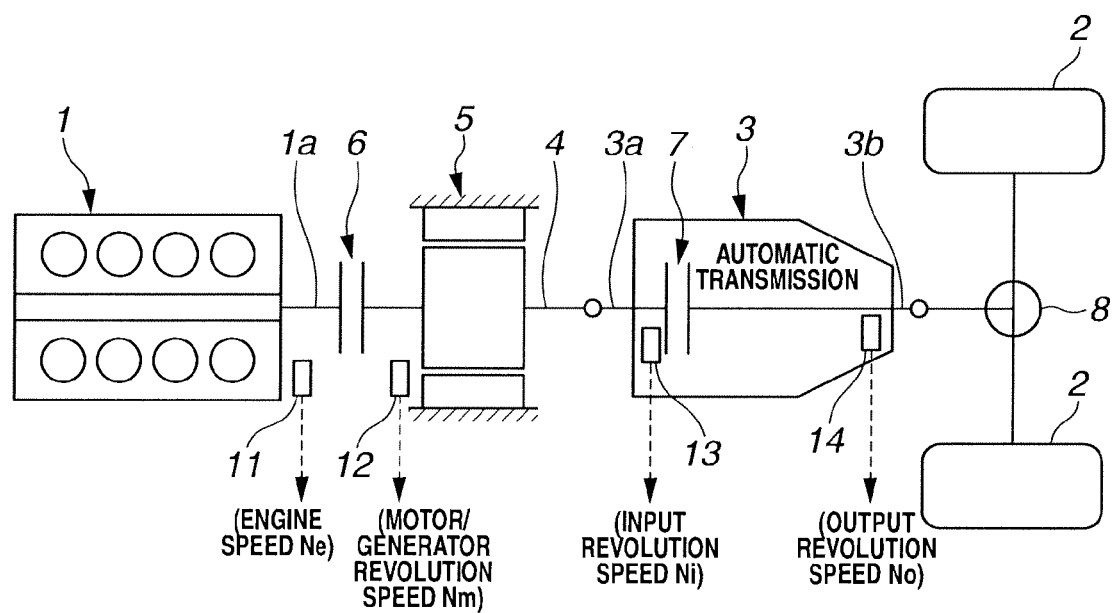
FIG. 3 is a configuration explanatory view representing a further modification of the power train of the vehicle to which the present invention is applicable.

In addition, as in the embodiment shown in FIGS. 1 and 2, an exclusively used second clutch 7 is equipped at a front side or rear side of automatic transmission 3. In place of this exclusively used second clutch 7, as second clutch 7, as shown in FIG. 3, a known frictional element for a forward gear shift stage selection purpose or a frictional element for a reverse gear shift stage clutch may be used. In this case, second clutch 7 is not always a single frictional element but may be second clutch 7 of appropriate frictional elements in accordance with the gear shift stage.

Figure 4:
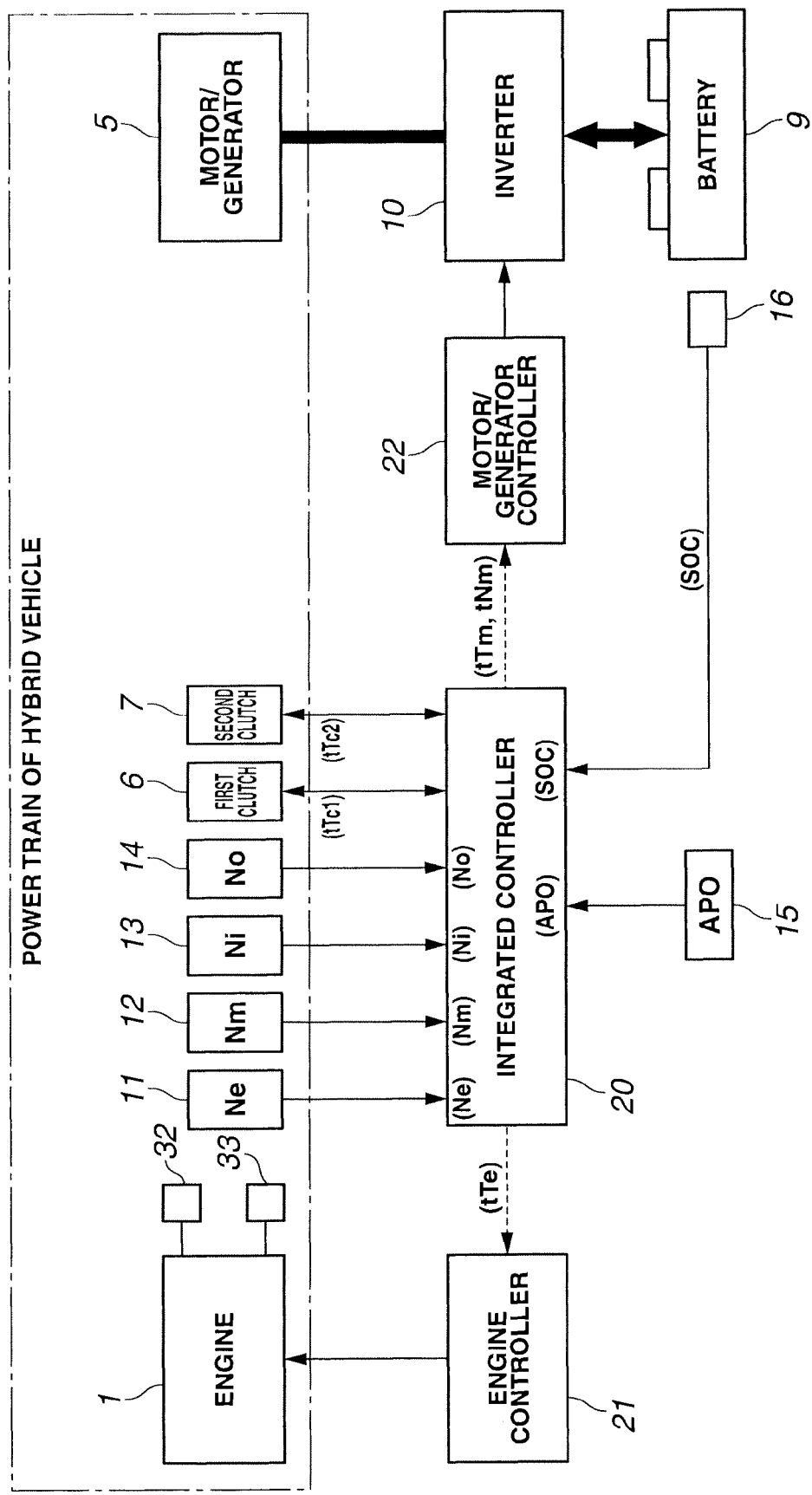
FIG. 4 is a block diagram representing a control system of the power train in the preferred embodiment shown in FIG. 1.

FIG. 4 shows a control system configuration in a power train for a hybrid vehicle structured as in FIGS. 1 through 3.

This control system includes an integrated controller 20 which integrally controls an operating point of the power train.

The operating point of this power train is prescribed by a target engine torque tTe, a target motor/generator torque tTm (or a target motor/generator revolution speed tNm), a target transmission torque capacity tTc1 of first clutch 6, and a target transmission torque capacity tTc2 of second clutch 7.

In addition, this control system at least includes: an engine speed sensor 11 which detects an engine speed Ne; a motor/generator revolution speed sensor 12 which detects a motor/generator revolution speed Nm; an input shaft revolution speed sensor 13 which detects a revolution speed Ni of input shaft 3a of automatic transmission 3; an output shaft revolution speed sensor 14 which detects a revolution speed No of automatic transmission 3; an accelerator opening angle sensor 15 which detects an accelerator pedal depression quantity (accelerator opening angle APO) representing a requested load state of engine 1; and a charged state sensor 16 which detects a charged state SOC of battery 9 which charges the electric power of motor/generator 5. To determine the above-described operating point, these detection signals are inputted to integrated controller 20.

It should be noted that engine speed sensor 11, motor/generator revolution speed sensor 12, input revolution sensor 13, and output revolution sensor 14 are arranged as shown in, for example, FIGS. 1 through 3.

Above-described integrated controller 20 selects one of the traveling modes (EV mode or HEV mode) which is achievable for a vehicular driving force that a vehicle driver requires from accelerator opening angle APO, a battery state of charge (SOC), and an output shaft speed No (vehicle speed VSP) of automatic transmission 3 and calculates target engine torque tTe, target motor/generator torque tTm (or target motor/generator revolution speed tNm), target first clutch transmission torque capacity tTc1, and target second clutch transmission torque capacity tTc2, respectively.

Above-described target engine torque tTe is supplied to an engine controller 21 and engine controller 21 controls engine 1 so that an actual engine torque Te gives a target engine torque tTe. For example, above-described engine 1 is constituted by a gasoline engine and engine torque Te is controlled via a throttle valve.

On the other hand, above-described target motor/generator torque tTm (or target motor/generator revolution speed tNm) is supplied to motor/generator controller 22. This motor/generator controller 22 controls motor/generator 5 via inverter 10 so that a torque Tm (or revolution speed Nm) of motor/generator 5 gives target motor/generator torque tTm (or target motor/generator revolution speed tNm).

In addition, above-described integrated controller 20 supplies solenoid currents respectively corresponding to target first clutch transmission torque capacity tTc1 and target second clutch transmission torque capacity tTc2 to clutch control solenoid valves (not shown) of first clutch 6 and second clutch 7 and individually controls the clutched states of first clutch 6 and second clutch 7 so that transmission torque capacity Tc2 of second clutch 7 is made coincident with second clutch transmission torque capacity tTc2.

In addition, as a variably operated valve mechanism which is modifiable a valve lift characteristic (open-and-closure timing (a valve timing) of an intake valve of the engine or an exhaust valve thereof (hereinafter, referred to as an intake·exhaust valve), an open-and-closure interval of time (working angle) of the intake·exhaust valve, a maximum lift quantity, and so forth), a variable valve timing mechanism for the intake valve side (intake VTC) 32 and a variable valve timing mechanism (exhaust VTC) 33 for the exhaust valve side are installed in engine 1 of this embodiment. As described in, for example, a Japanese Patent Application First Publication No. 2010-208394, a revolution phase of a camshaft of intake•exhaust valve side to a crankshaft is modified so that a valve open timing and a valve closure timing are modified so that opening timing and closure timing of the intake•exhaust valve are simultaneously and continuously retarded and advanced. In addition, each of these valve timing mechanisms 32, 33 is of a hydraulic pressure drive type driven in accordance with the hydraulic pressure of the working oil and its operation is controlled by means of above-described engine controller 21.

In addition, a catalyst such as a three-way catalyst to purify exhaust gas is disposed in an exhaust system of engine 1. In a case where engine 1 is in a predetermined cold state and the catalyst is yet inactivated state, a warm-up of the engine is promoted to activate the catalyst at an earlier timing. This is called an exhaust temperature rise control to promote a temperature rise of exhaust gas. One of this exhaust temperature rise controls includes a retardation of an ignition timing through an ignition plug (an ignition device) in a spark-ignited engine such as a gasoline engine from a basic ignition timing (for example, MBT point) so that a combustion efficiency is intentionally reduced and the temperature of exhaust gas is accordingly raised.

During the idling drive of the engine, the idling revolution speed control using a feedback control is carried out so that engine revolution speed Ne (it should be noted that, in this situation, engine speed Ne is made substantially equal to motor/generator revolution speed Nm) is maintained at a predetermined idling revolution speed. In such an idling revolution speed control as described above, in this embodiment, a motor idling mode in which engine 1 side performs a torque control toward the target torque and the idling revolution speed control is performed through the revolution speed control by means of motor/generator 5 and an engine idling mode in which motor/generator 5 side is torque controlled and the idling revolution speed control through an adjustment of the throttle valve opening angle such as an engine 1 itself (in other words, engine controller 21) are switched in accordance with the driving state.

It should be noted that, during the idling drive, the motor idling mode through motor/generator 5 is basically selected due to its high control stability and in a case where, for example, a charge quantity of the battery is extremely insufficient and in a case where the idling drive in the motor idling mode, the engine idling mode is selected.

Then, during the idling drive in the engine cold state, the ignition timing of the engine in the motor idling mode is retarded than the ignition timing of the engine in the engine idling mode.

The retardation angle quantity of the ignition timing is expanded (hereinafter, called the retardation quantity) so that the exhaust temperature is promoted to be raised and an exhaust emission is reduced due to the activation of the catalyst at the early timing. An example of the control at the time of idling drive in such a engine cold state as described above will, hereinafter be explained.

It should be noted that in a case where, during the start of the hybrid vehicle through an ignition operation, for example, of the vehicle driver, engine 1 is in the cold state, engine 1 is started as the HEV mode in which engine 1 is coupled with motor/generator 5 through first clutch 6 even during the stop state of the vehicle in order to activate to the catalyst to warm up engine 1 at the earlier timing.

Then, unless no accelerator manipulation is present, as will be described later, the vehicle driving state is transited from the state immediately after the engine start to the idling drive state and the exhaust temperature rise control according to the retardation angle of the ignition timing and so forth is carried out. The engine cold state may be determined according to an engine temperature, for example, by the detection or estimation of an oil temperature sensor, a water (coolant) temperature sensor, or so forth.

Figure 5:
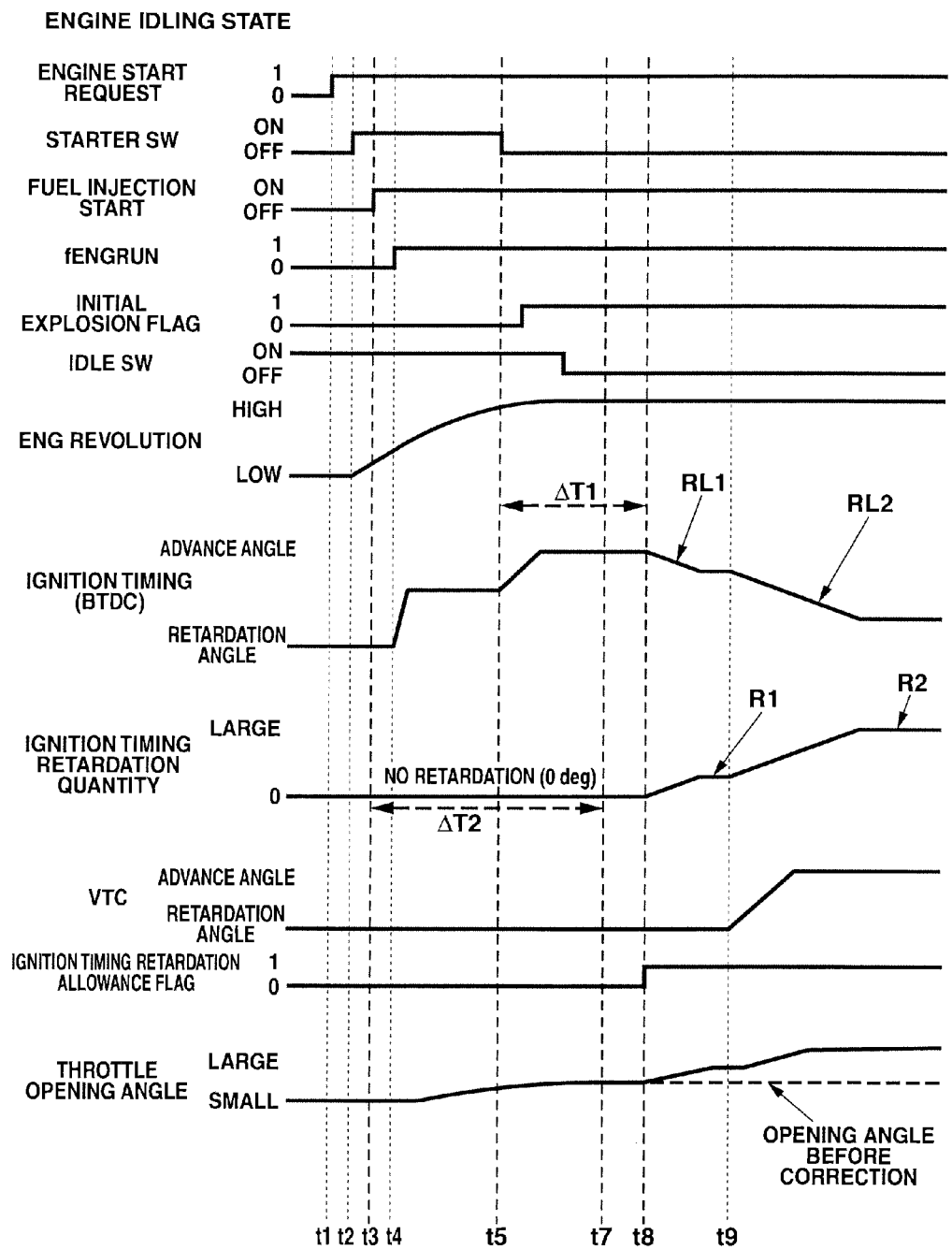
FIG. 5 is a timing chart representing a variation of an ignition timing of the engine and so forth at the time of the switching from an engine idling mode to a motor idling mode during a cold start of the engine.
Figure 6:
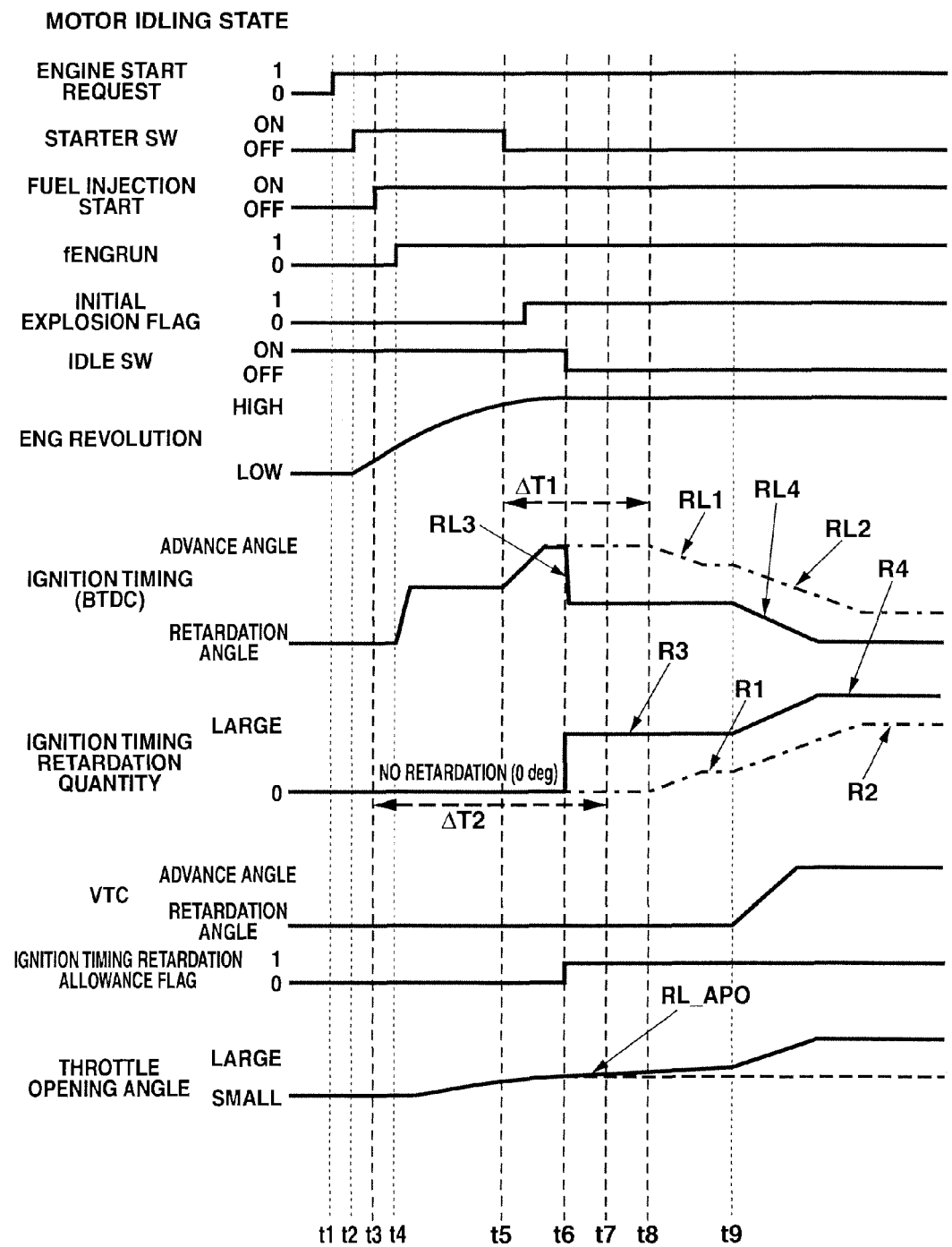
FIG. 6 is a timing chart representing the variation of the ignition timing at the time of the motor idling state.

FIGS. 5 and 6 show timing charts representing the variations of the ignition timing and so forth at the time of the engine cold start state.

FIG. 5 shows an example of the engine idling state in which the idling drive is continued through the engine idling mode in a case where battery charge quantity SOC is extremely low and so forth so that the switching to the motor idling mode is not allowed.

First, by referring to FIG. 5, an operation of the engine idling state will be described. At a time point t1 at which the switching of an engine start request flag to "1", in other words, an engine start request is detected, a starter switch (SW) is turned from OFF to ON at a time point of t2. The cranking of engine 1 through motor/generator 5 is started and the engine revolution speed is raised. Fuel injection is started at a time point of t3 during the cranking. When a flag fEN-GRUN indicating the start of the revolution of the engine is set to "1", the ignition timing is advanced toward the ignition timing at the time of engine start.

When, at a time point of t5, the engine speed is raised and reaches to a proximity of the idling revolution speed, a starter switch (SW) is turned to OFF and the cranking is finished. At this time, since engine idling switch (idle SW) is turned to ON, the idling drive through the engine idling mode is carried out.

In addition, in order not to generate an engine vibration (a rough idling) due to the variation of the engine revolution speed in the engine idling speed, the retardation of the ignition timing is inhibited during a predetermined time $\Delta T1$ from the cranking end time t5 to time point t8 in the engine idling mode and the retardation quantity is made zero.

After a predetermined time $\Delta T1$ has passed from a cranking finish time point t5 of the cranking (viz., after a time point t8), a rough idle is finished and the idling drive becomes stable so that an ignition timing retardation allowance flag is set to "1" to start the retardation of the ignition timing. Specifically, a target value of the retardation quantity of the ignition timing is set to a predetermined first retardation quantity R1 and an upper limit of a variation speed (variation rate) of the ignition timing is limited to a predetermined value RL1 so that a reduction of a combustion stability due to an abrupt modification of the ignition timing, a revolution variation, and so forth are not generated. Thus, the ignition timing is gradually retarded toward first retardation quantity R1.

When the drives of variable valve timing mechanisms 32, 33 of the hydraulic pressure drive type become possible along with the rise in the hydraulic pressure, at a time point of t9, the valve timing is advanced toward a predetermined advance angle position in order to make the further retardation of the ignition timing. Along with the modification (advance angle) of the valve timing as described above, the retardation quantity of the ignition timing is set to a second retardation quantity R2 further expanded from above-described first retardation quantity R1. Thus, the modification of the valve timing by means of the hydraulic pressure drive is unavoidably accompanied with a response delay and the ignition timing is gradually varied in synchronization with the modification of this valve timing. The upper limit of the variation speed of the ignition timing is limited to predetermined value RL2 and an excessive retardation of the ignition timing is, in a transient time, suppressed and avoided.

In addition, the throttle valve opening angle is correctively controlled toward an open side so that the intake air quantity is increased in accordance with the retardation of the ignition timing in order to compensate for the reduction of the actual engine torque along with the retardation of the ignition timing.

Next, FIG. 6 is a timing chart representing the variation of the ignition timing and so forth at the time of the engine cold start in the same way as FIG. 5. Especially, FIG. 6 shows an example of the motor idling state which can be switched from the engine idling mode to the motor idling mode at the time of idling drive. It should be noted that the characteristic denoted by a dot-and-dash line in FIG. 6 represents the characteristic at the time of the engine idling state shown in FIG. 5.

The engine idling time in FIG. 5 is the same as the time duration from a time (t1) at which the start request is issued to a time at which the starter switch is turned OFF so that the cranking is ended (t5). When, at a time point of t6, engine idle switch SW is switched from ON state to OFF state, the idling drive mode is switched from the engine idling mode to the motor idling mode. It should be noted that an engine idling switch SW is a signal processed by means of engine controller 21. If engine idling switch SW is in an OFF state, an execution of the idling revolution speed control (ISC) by means of engine 1 is inhibited. The switching timing to the motor idling mode is at a time point t6 at which the idling revolution speed becomes stable after an initial explosion determination of engine 1 (an initial explosion flag indicating "1"). The timing is not limited to this but may be immediate after, for example, the initial explosion flag is at a "1".

In addition, at a time point of t6, at the same time when the switching to the motor idling mode is made, the ignition timing retard allowance flag is "1", the ignition timing retardation to improve the exhaust temperature rise effect is allowed, and the ignition timing is once retarded to target retardation quantity R3. Specifically, the target value of the retardation quantity of the ignition timing is third retardation quantity R3 which is expanded further than first retardation quantity R3 in the engine idling drive. Then, the limitation of the variation speed of the ignition timing is released or, with the limitation value (upper limit value) RL3 of the variation speed of the ignition timing as a maximum, the limitation of the variation speed of the ignition timing is largely retrieved. The modification of the ignition timing by means of the spark plug can be responded with a good responsive characteristic. Retardation quantity R3 of the ignition timing can be reflected on the ignition timing at the substantially the same time as switching t6 to the motor idling mode. It should be noted that variable valve timing mechanisms 32, 33 of the hydraulic pressure drive type are not yet driven at the time point of t6 to the motor idling mode. The valve timing is held at the most retardation angle position which is the initial state of the valve timing during the engine stop. Third retardation quantity R3 corresponds to a maximum retardation quantity which can be taken from a most retardation angle position of the valve timing.

In an actual control logic, a predetermined limitation interval of time is provided for the retardation control of the ignition timing accompanied by the most retardation control along with the transition to the motor idling mode. Specifically, unless due to the switching of the engine idling switch SW from the ON state to the OFF state within a predetermined time interval of $\Delta T2$ (for example, about 2 seconds) from time point t3 of fuel injection start to the time point t7, the switching between the engine idling mode to the motor idling mode is detected and determined, the control such that the ignition timing is retarded to third retardation quantity R3 without limitation on the variation speed of the ignition timing as described above.

In addition, as described above, although the throttle opening angle is correctively controlled toward the open side in accordance with the retardation quantity of the ignition timing, the intake air quantity and an air-fuel mixture ratio are unintentionally varied when the throttle valve opening angle is abruptly opened in accordance with an abrupt retardation of the ignition timing at the switching time point t6. Thus, the upper limit of the variation speed of the throttle valve opening angle is limited to a predetermined value RL_APO.

Figure 7:
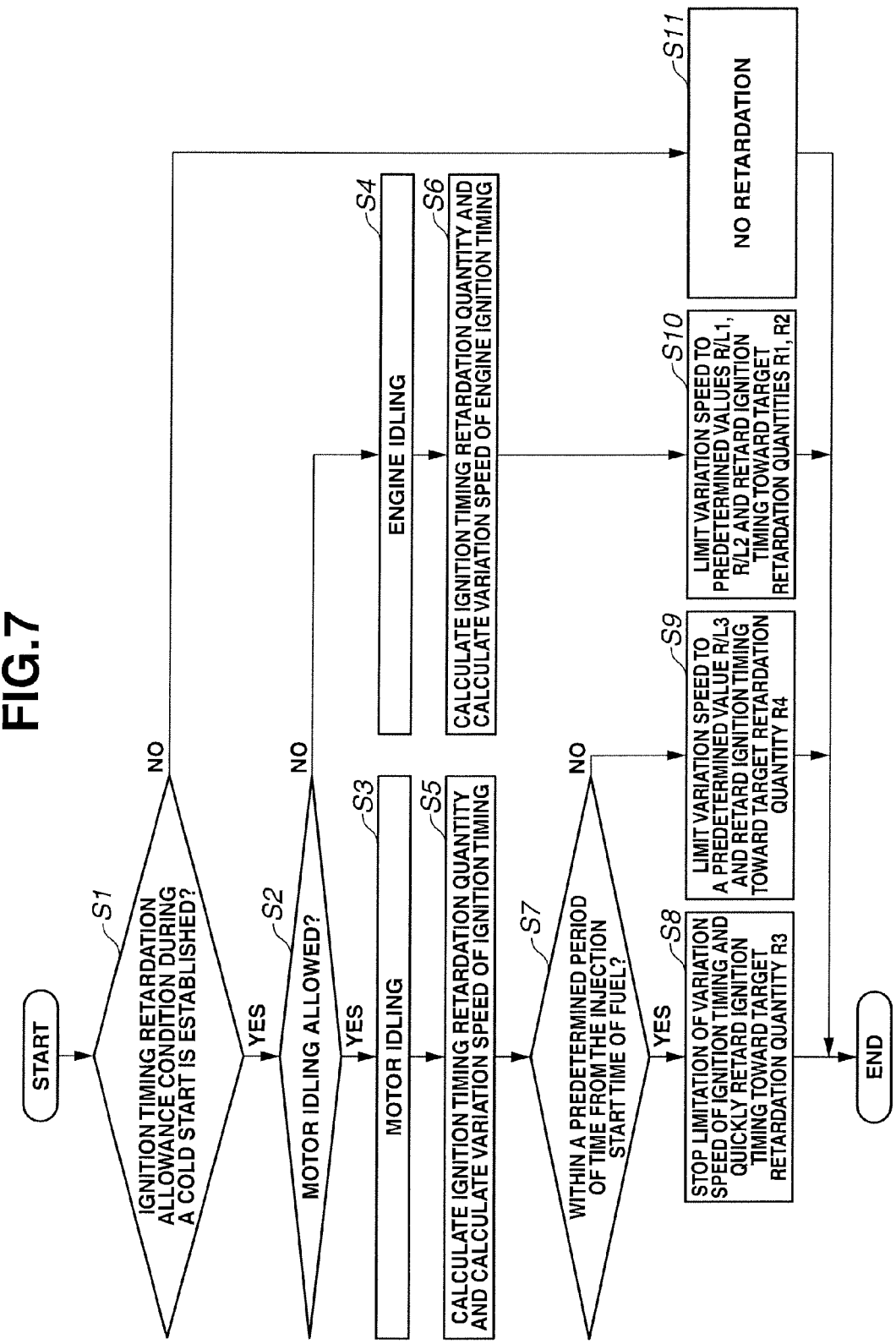
FIG. 7 is a flowchart representing a flow of an idling control at the time of the cold start related to the preferred embodiment shown in FIG. 1.

FIG. 7 is a flowchart representing a flow of the idling control at the time of the engine cold start described above.

At a step S1, integrated controller 20 determines whether an allowance condition of the retardation (retardation angle) of the ignition timing for the exhaust temperature rise from the engine coolant temperature at the time of the start of engine 1, an estimated thermal quantity supplied to the catalyst, and a passage time from the OFF state (cranking finish) of above-described starter switch SW, and so forth. For example, in a case where the catalyst is estimated to be already in the activation state from the estimated thermal quantity supplied to the catalyst, it is not necessary to perform the retardation of the ignition timing. Hence, the allowance condition of the retardation of the ignition timing is determined to be un-established and the routine goes to a step S11. At step S11, the retardation of the ignition timing is inhibited and an ordinary ignition timing control toward a basic ignition timing such as a most appropriate (optimum) ignition timing (MBT point) is carried out with the retardation quantity zero.

On the other hand, if the ignition timing retardation allowance condition is established (Yes), the routine goes to a step S2. At step S2, integrated controller 20 determines whether it is possible to perform the idling revolution speed control in the motor idling mode from the charge state SOC of battery 7, a battery temperature, an input/output voltage (current) of the battery, and so forth. As described above, the routine goes to a step S3 if the motor idling mode is basically allowed. In a case where the charged state SOC of battery 7 is extremely small, the idling drive in the motor idling mode is determined to be not allowed and the routine goes to a step S4 in which the idling mode is switched to the engine idling mode.

In a case where the motor idling mode is allowed, the routine goes to a step S3. At step S3, engine idling switch SW is turned to OFF so that the idling drive through the motor idling mode is carried out.

At the subsequent step S5, integrated controller 20 calculates and sets retardation quantity (R3, R4) of the ignition timing and the limitation value (RL3, RL4) of the variation speed of the ignition timing on a basis of the water temperature, the engine revolution speed, the torque (target engine torque in a case of the motor idling mode), the valve timing, the traveling/non-traveling mode, and so forth. Since, as shown in FIG. 6, a control stability is high in the motor idling mode as compared with the engine idling mode, the retardation quantity of the ignition timing is expanded (R3>R1, R4>R2) with respect to the engine idling mode and the limitation of the variation speed of the ignition timing is relieved, namely, the limitation value (upper limit value) of the variation speed is enlarged (RL3>RL1, RL4>RL2). Hence, in a driving scene such that as the retardation quantity becomes increased along with the modification of the valve timing toward the advance angle side after time point t9 shown in FIG. 6, the variation speed (RL4) of the ignition timing in the motor idling mode becomes larger than the variation speed (RL2) in the engine idling mode so that a quick modification of the ignition timing toward target retardation quantity R4 can be achieved.

At a step S7, integrated controller 20 determines whether it is within a predetermined interval of time Δ T2 from time point t3 of the fuel injection start in a case where the state is transited toward the motor idling mode after the start of the engine. In other words, integrated controller 20 determines whether it is during the transient interval of time at the time of engine start. If a predetermined interval of time Δ T2 is not passed, the routine goes to a step S8. At step S8, retardation quantity R3 of the ignition timing corresponding to the maximum retardation quantity is set to third retardation quantity R3 which can be taken as a maximum retardation angle position before the modification of the valve timing as shown in FIG. 6.

In addition, since the control stability is high in the case of the motor idling mode, the limitation of the variation speed of the ignition timing is inhibited in order for the retardation quantity of the ignition timing to speedily be retarded to third retardation quantity R3 or the ignition timing is retarded to a target ignition timing at an earlier timing by maximizing upper limit value RL3 of the variation speed.

After the mode transition to the motor idling mode is made, at a time point reached to t9, variable valve timing mechanisms 32, 33 are driven, in order to make the further retardation of the ignition timing, so that the valve timing is advanced at a predetermined advance angle position. Since, at this time point, predetermined interval of time Δ T2 from fuel injection timing t3, the routine goes from step S7 to a step S9 in which the ignition timing is set to a fourth retardation quantity R4 which is further larger than third retardation quantity R3. The variation speed (variation rate) of the ignition timing is limited to predetermined value RL4 so that the ignition timing is gradually retarded to follow the variation to the advance angle side of the valve timing, with the variation speed of the valve timing by means of the hydraulic drive type variable valve timing mechanisms 32, 33 taken into consideration.

Consequently, as shown in FIG. 6, at time point t9 at which the advance angle of variable valve timing mechanisms 32, 33 is started, the ignition timing is gradually retarded toward fourth retardation quantity R4 whose quantity is expanded to be further larger than third retardation quantity R3 along with the modification of the valve timing toward the advance angle side.

On the other hand, when the motor idling mode is determined to be not allowed, engine idling switch SW is turned to ON at step S4 so that the idling drive is performed in the engine idling mode. At the subsequent step S6, in the same way as step S5, integrated controller 20 calculates and sets retardation quantities (R1, R2) of the ignition timing, the variation speed of the ignition timing, namely, the limitation value of the variation rate (RL1, RL2) on a basis of the coolant temperature at the present driving point, the engine revolution speed, the torque (in the case of the engine idling mode, the target motor torque), the valve timing, traveling/non-traveling mode, and so forth. As denoted by a dot-and-dash line of FIG. 6, the control stability is low in a case of the engine idling mode as compared with the motor idling mode. Thus, the retardation quantity of the ignition timing is suppressed to be smaller than the motor idling mode so as to secure the idling stability and the limitation of the variation speed of the ignition timing (limitation value of the variation rate) is made large.

Since, as described in the embodiment described above, the ignition timing (firing timing) of the engine in the motor idling mode is retarded to be larger than the firing timing of the engine in the engine idling mode. Hence, the retardation quantity (retardation angle quantity) can be expanded without influence on the idling stability. Thus, for example, the exhaust temperature rise of the engine can be promoted and the exhaust emission can be reduced due to the early activation of the catalyst. In addition, in the engine idling mode, the stable idling drive can be performed by suppressing the retardation angle quantity of the ignition timing.

In the motor idling mode, the control stability is high as compared with the engine idling mode. While the stability of the idling drive is secured, the limitation of the variation speed of the ignition timing is relieved to enlarge the variation speed of the ignition timing so that the ignition timing can be reached to the target retardation quantity at the earlier timing after the engine cold start and it becomes possible to rise the temperature of the catalyst at the earlier timing.

It should be noted that, in the motor idling mode, the engine is torque controlled toward the target torque. Since this target torque becomes smaller, a sensitivity of the torque with respect to the variation of the ignition timing becomes smaller. Hence, it becomes possible to further increase the variation speed of the ignition timing. Hence, in the motor idling mode at the time of the engine cold state, as the target torque at the engine side becomes smaller, the limitation of the variation speed of the ignition timing is relieved.

Furthermore, in a case where the idling mode is switched from the engine idling mode to the motor idling mode at the time of the cold start, the limitation of the variation speed of the ignition timing of the engine is inhibited or the limitation of the variation speed is largely relieved so that the ignition timing immediately after the switching to the motor idling mode is speedily retarded to the target retardation quantity.

It becomes possible to further expand the retardation angle quantity of the ignition timing in the engine cold state by modifying the valve lift characteristic through variably operated valve mechanism which are modifiable valve lift characteristics of the intake·exhaust valve as in the case of the variable valve timing mechanisms 32, 33. In this case, as described above, the ignition timing is gradually retarded in accordance with the modification of the valve timing, namely, the ignition timing is gradually retarded in accordance with the conversion of the valve timing so that the ignition timing can be suppressed and avoided from being excessively retarded in the transient state.

As described hereinabove, the present invention has been described on a basis of the specific embodiment but the present invention is not limited to the above-described embodiment. Various modifications and variations are included without departing from the scope of the present invention. For example, in the above-described embodiment, the spark ignited ignition type engine such as a gasoline engine in which the spark plug (ignition device) has been equipped has been used. However, the present invention is not limited to this. The present invention is applicable to a compressed self ignition type engine such as a Diesel engine in which air mixture fuel within the combustion chamber is compressed and self ignited. In this case, for example, by controlling the fuel injection timing, the firing timing can be retarded or advanced.

In addition, the above-described embodiment has been explained assuming that the present invention is applicable to the hybrid vehicle but the present invention is applicable to the vehicle in which only the internal combustion engine is used as the dynamic power source and the idling revolution speed control is carried out with the starter motor as the power running.

The invention claimed is:

1. An idling control apparatus for a vehicle, comprising:
an engine; and
a motor, both of the engine and the motor being mutually linked with each other, the idling control apparatus performing an idling revolution speed control to maintain an engine speed at a predetermined target idling speed during an idling drive, being arranged to enable a switching between an engine idling mode in which the idling revolution speed control through the engine is carried out and a motor idling mode in which the idling revolution speed control through the motor is carried out, and being arranged to more largely retard a firing timing of the engine in the motor idling mode with respect to the firing timing of the engine in the engine idling mode, during the idling drive in a predetermined engine cold state.

2. The idling control apparatus for the vehicle as claimed in claim 1, wherein, in the motor idling mode, the idling control apparatus relieves a limitation of a variation speed of the firing timing of the engine as compared with the engine idling mode.

3. The idling control apparatus for the vehicle as claimed in claim 1, wherein, in the motor idling mode, the idling control apparatus performs a torque control for the engine to be directed toward a predetermined target torque and relieves a limitation of a variation speed of the firing timing, as the target torque becomes smaller.

4. The idling control apparatus for the vehicle as claimed in claim 1, wherein, in a case where the idling mode is switched from the engine idling mode to the motor idling mode during the cold start of the engine, the idling control apparatus retards the firing timing of the engine to a predetermined retardation angle quantity without a limitation of a variation speed of the firing timing of the engine.

5. The idling control apparatus for the vehicle as claimed in claim 1, wherein the engine includes a variably operated valve mechanism that is modifiable a valve lift characteristic of at least one of an intake valve of the engine and an exhaust valve thereof and, during the engine idling drive in the engine cold state, retards the firing timing of the engine in accordance with a modification of the valve lift characteristic.

6. The idling control apparatus for the vehicle as claimed in claim 1, wherein the engine includes an ignition device that spark ignites air mixture fuel within a combustion chamber and, during the idling drive in the engine cold state, the idling control apparatus, through the ignition device, more largely retards an ignition timing of the engine in the motor idling mode with respect to the ignition timing of the engine in the engine idling mode.

* * * * *